United States Patent [19]

Foster et al.

[11] Patent Number: 5,046,280
[45] Date of Patent: Sep. 10, 1991

[54] DEVICE FOR KILLING INSECTS

[75] Inventors: James P. Foster, Chadds Ford, Pa.; Philip V. Jennings, Wilmington, Del.

[73] Assignee: E. I. du Pont de Nemours & Company, Wilmington, Del.

[21] Appl. No.: 340,286

[22] Filed: Apr. 19, 1989

[51] Int. Cl.$^5$ .............................. A01M 1/20
[52] U.S. Cl. ...................................... 43/131
[58] Field of Search ............ 43/107, 131, 124, 132.1

[56] References Cited

U.S. PATENT DOCUMENTS

| | | | |
|---|---|---|---|
| 995,280 | 6/1911 | Nemsey | 43/131 |
| 1,228,170 | 5/1917 | Beleal | 43/131 |
| 1,631,121 | 6/1927 | Eckl | 43/131 |
| 2,193,492 | 3/1940 | Richardson | 43/107 |
| 3,826,036 | 7/1974 | Neugebauer | 43/131 |
| 4,310,985 | 1/1982 | Foster | 43/131 |
| 4,873,787 | 10/1989 | Schneidmiller | 43/107 |

Primary Examiner—Kurt Rowan

[57] ABSTRACT

This invention concerns a device for killing insects consisting essentially of a toxin-containing target element, an optional mesh covering for the toxin-containing element to protect nontarget organisms from contact with the toxin, and a reservoir that is movable relative to the target and cooperating with it to store dead insects; and a method for killing insects comprising exposing them to the described device.

12 Claims, 2 Drawing Sheets

DEVICE FOR KILLING INSECTS

BACKGROUND OF THE INVENTION

This invention concerns a disposable container for killing insects especially flying insects and most especially flies. For the sake of brevity, the description provided hereafter will refer to the device primarily in its capacity to kill flies.

Certain 2-(nitromethylene)-1,3-thiazines and derivatives thereof are disclosed in U.S. Pat. No. 3,993,648, 4,501,742 and 4,065,560 as having useful insecticidal activity against the house fly (*Musca domestica*). The insecticidal activity of tetrahydro-2-(nitromethylene)-2H-1,3-thiazine (TNMT) and other nitromethylene heterocycles are disclosed in Pesticides and Venom Neurotoxicity, Shankland et al., pages 153 to 169 (1978). The physical, chemical and insecticidal properties of these compounds are further disclosed in Advances in Pesticide Science, Part 2, Geissbuhler et al., pages 206 to 217, Symposia Papers from Fourth International Congress of Pesticide Chemistry, July, 1978.

There are myriad patent disclosures of fly traps going back at least to the mid-1800's. One of the more recent patents on this subject matter is U.S. Pat. No. 4,310,985 which discloses use of the preferred toxicants described herein in an insect trap comprising a hollow base section having a containment cavity to hold the dead insects.

One primary distinction enjoyed by the devices of this invention over earlier flytraps is that they can be opened so that the toxic area is almost completely accessible and visible to target insects. They can be closed after use to house the insects that have succumbed to the toxin. When the container is open, there is no necessity to lure the insects into an inner chamber or to entice them to any one portion of the surface. After the device has served its purpose it can be closed and disposed of along with its contents.

SUMMARY OF THE INVENTION

This invention pertains to a device for killing insects consisting essentially of these two components that are movable in relation to one another:

(i) a toxin-containing target with an optional mesh covering and an optional attractant for the insects; and (ii) a reservoir closable with the target so that the target is not exposed and openable so that the target is exposed, the reservoir serving to hold insects killed by contact with the exposed target. This invention also concerns a method for killing insects comprising exposing them to the described device.

The device of this invention is characterized in that, when the container is open, element (i), which contains an effective amount of an arthropodicidally active toxin, is freely accessible to, and visible by, target insects. There is an optional relatively open-mesh covering for the target surface whose primary purpose is to protect nontarget organisms from contact with the toxin. The covering can also serve as a substrate for attractants including sex attractants, pheromones, food and the like which will attract insects to the surface of the device thus maximizing the effect of the device in controlling them. To simplify discussion of the device and its use, the descriptions provided hereafter will be confined to "flies" with the understanding that they are applicable to other insects as well.

For the sake of simplicity, the covering will be referred to as a "mesh" it being understood that said term encompasses any geometric shape or design that will accomplish the purpose of protecting non-target organisms from contact with the toxin. Although not necessary to the primary function of the device, the mesh does provide an important measure of safety. The mesh can be woven in the shape of a grid, lattice or an open lace. Alternatively, the safety feature can be met by a series of short protuberances or spars protruding from the target surface with the toxin nestled in the valleys therebetween, or by a series of depressions which hold the toxin with the higher surface plateau serving to prevent contact with the toxin. There are numerous other possibilities, including an embossed surface, consistent with the caution that the mesh should not interfere in any substantial way with the inclination of the insect to feed at the toxic surface(s) and that it should not trap dead insects. The term "mesh" is intended to cover these and any other means of preventing contact with the toxin that will readily occur to one skilled in the art.

Element (ii) is usually the housing or cover for the device when it is closed. When open, element (ii) serves as the reservoir for dead insects. The Figures show two typical embodiments of this invention: wherein element (ii) is slidably adapted to enclose target element (i) with its safety mesh covering, and wherein the relation of (i) and (ii) is such that they close like jaws. In each embodiment, there is an appropriate volume of element (ii) to hold dead insects pending discard of the device with its contents.

Representative of the insects against which the devices of this invention have been found most effective are flies of the genus Musca, including the house fly (*Musca domestica*) and the bush fly (*Musca vertustissima*), as well as flies of other families, such as the blow fly (*Calliohora vomitoria*), the fruit fly (*Drosoohila melanooaster*), the stable fly (*Stromoxvs calcitrans*) and the little house fly (*Fannia spp*).

The house fly is believed to activate its feeding mechanism after receiving appropriate stimuli via chemoreceptors believed to exist on its tarsi or feet. The feeding mechanism then involves a process wherein the fly lowers its proboscis to the surface upon which it has landed, expels saliva through the proboscis and finally sucks back whatever solution results. This process is believed to be virtually automatic when the fly lands on an appropriate surface. By this mechanism, a fly landing on the target area of the device described herein will probe through the mesh to contact the target surface and ingest a lethal dose of toxicant.

The preferred toxicant is tetrahydro-2-(nitromethylene)-2H-1,3-thiazine (TNMT) and agriculturally suitable salts thereof. Also preferred is the N-formyl derivative of TNMT. Additional details on preparation of toxicants can be found in U.S. Pat. No. 3,993,648, 4,501,742 and 4,065,560. The high water solubility of TNMT at room temperature promotes the fast takeup of a lethal dose by the flies when feeding and facilitates operation of the trap. The compound is nonvolatile in ordinary use, thereby releasing no harmful vapors to the atmosphere. Flies are readily attracted to feed on the device, since TNMT has little or no repellancy toward the insects.

When the toxicant is used as described in the present invention, the devices are effective for long periods provided they are not exposed to inordinate amounts of direct sunlight. Finally, while TNMT is highly active against insects, it is much less so toward higher animal forms such as rats, rabbits and other mammals. This low mammalian toxicity coupled with the safety mesh contributes to its suitability for widespread use without danger to people, animals or other non-target organisms. Additional details concerning TNMT's physical and chemical properties, pheromones, and other attractants are provided after the Example.

DETAILS OF THE INVENTION

Figure 1:
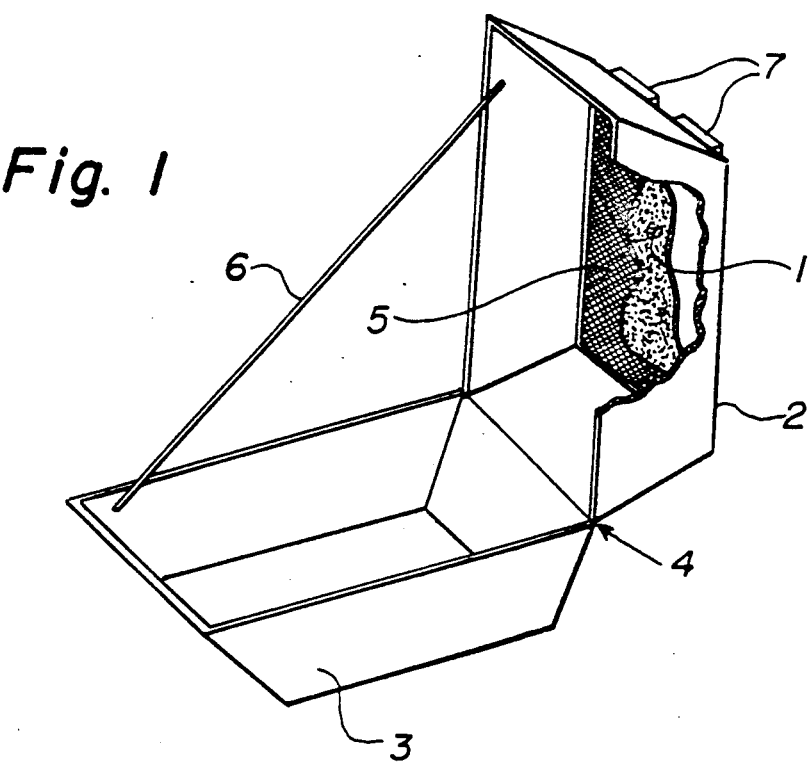
FIG. 1 is a side cross-section of the insect-killing device with a hinged lid target area/ reservoir closure system.

The following details can be understood most conveniently by reference to FIGS. 1 to 4. In FIG. 1, the target area, 1, of the depicted device can be composed of any porous material such as bundles of fibers including natural and man-made fibers, felt, muslin, cloth, or blotter paper. The target area is set into lid 2 and is preferably white or yellow in dimly lit areas with a darkened background, or, black or red surrounded by white in brightly lit or light background locations. Maximum contrast between the target area and adjacent surroundings is most effective. The target area can be of any size.

Lid 2 is attached to reservoir 3 by hinge 4 which allows movement of 2 in relation to 3. For best results, the surface of the target area should be opened so that the dead flies roll or fall off into reservoir 3 to provide continuous access to the target area by newly arriving flies. Alternatively, the device can be hung or mounted to facilitate the shedding of dead flies. When the container is mounted by means of adhesive strip(s) 7 to a wall or other structure, stop line 6 maintains an appropriate positional relationship between the lid/target area 1 and 2 and the reservoir component 3 of the device.

The target area is covered with a closely-fitting mesh, 5, which can be expandable. The mesh should allow contact by the flies on the target area and will contain openings of a size sufficient to permit the flies to land and feed on the target area surface. However, the main function of the mesh is to prevent accidental contact of the target area by humans and domestic pets and its openings are suitably limited to a size which accomplishes this function. Furthermore, the thickness of the mesh is suitably limited such that the depth of the openings will allow a fly standing on the highest portion of the mesh to reach and ingest some of the toxicant on the target area surface and not interfere with the shedding of intoxicated flies. A mesh with openings at least two millimeters on a side and one millimeter thick is preferred. The color of the mesh is preferably the same color as the target area.

Figure 2:
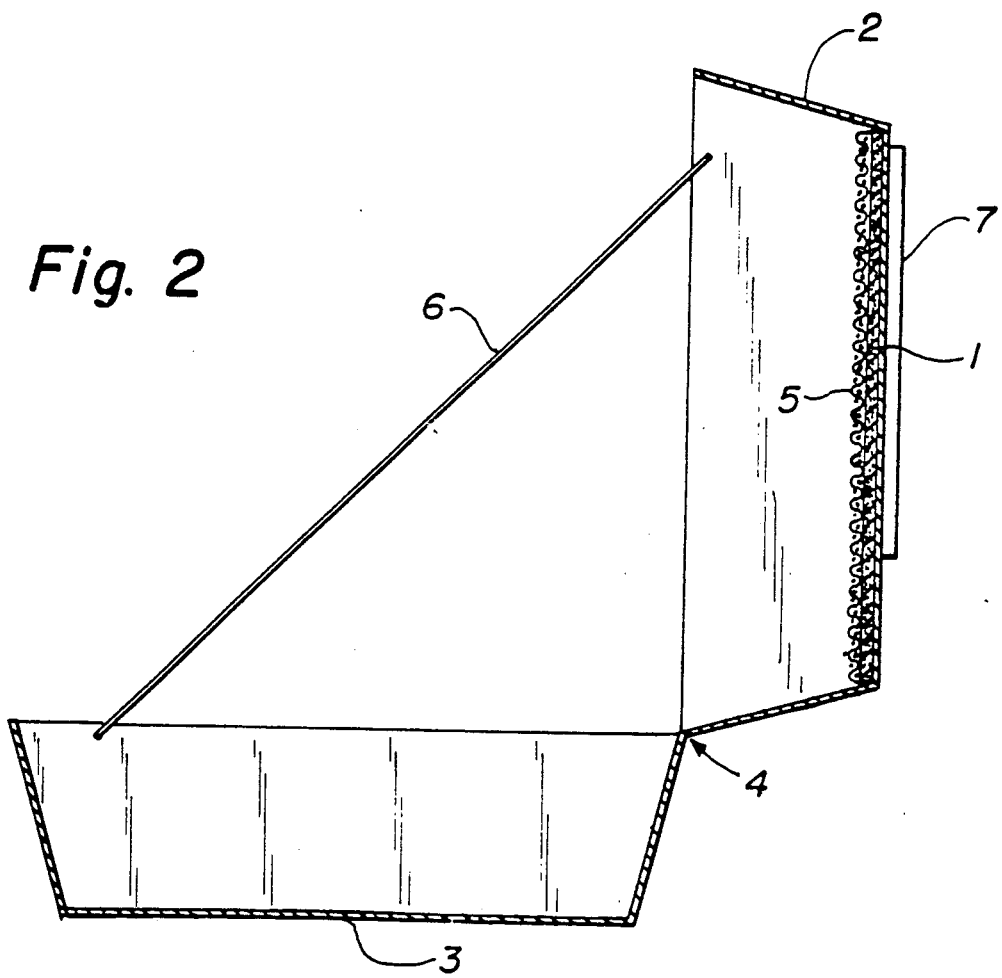
FIG. 2 is a horizontal cross-section of the device depicted in FIG. 1.

FIG. 2 depicts the device of FIG. 1 in cross-section wherein the toxicant is coated on or soaked into target area 1 covered by safety mesh 5. The device is mounted by adhesive strip 7. The device is maintained open by stop 6 so that dead flies roll off or fall into reservoir 3.

Figure 3:
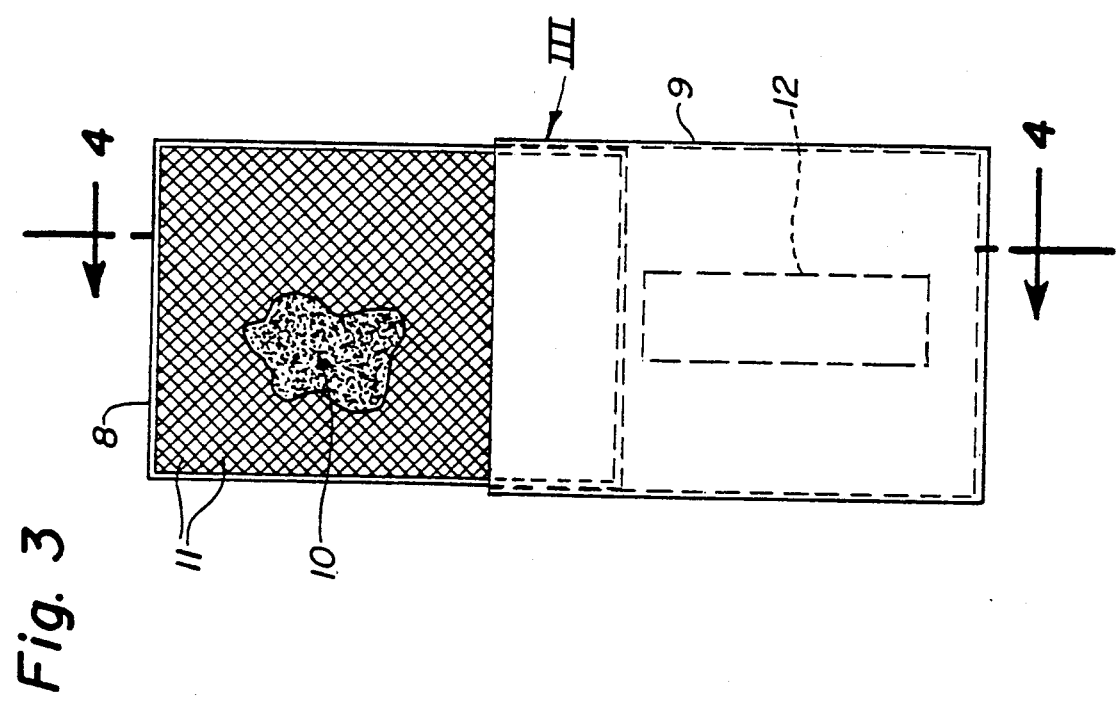
FIG. 3 is a sectional front elevation of the device of this invention designed with a sliding lid/reservoir closure system.

In FIG. 3, there is a slidable, friction-fit relationship between lid insert 8 and reservoir 9. When the lid is opened, target area 10 covered by safety mesh 11 is exposed to flies. An adhesive strip 12 is shown for mounting.

Figure 4:
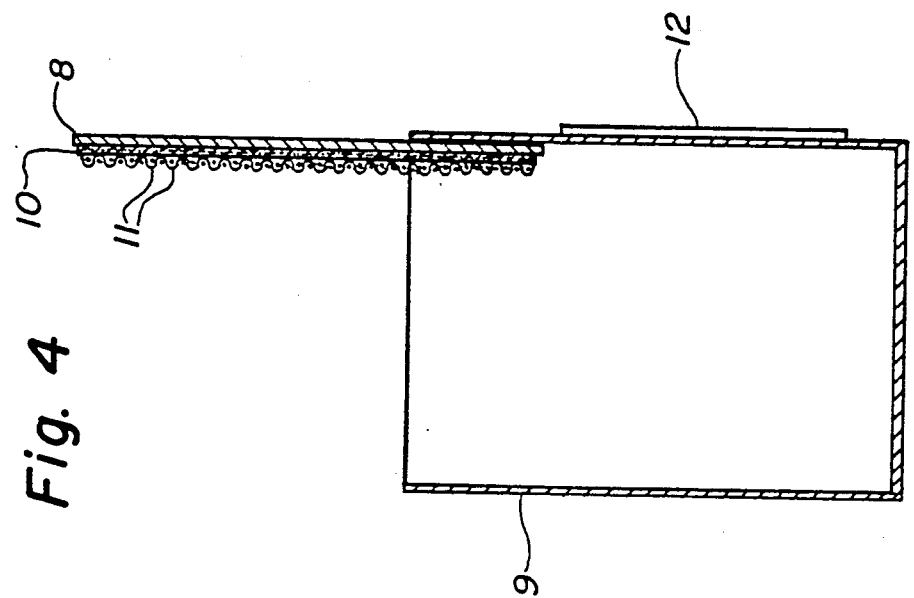
FIG. 4 is a horizontal cross-section along line 4—4 of the device depicted in FIG. 3 showing an adhesive strip for mounting.

In FIG. 4, the relationship is seen between the reservoir component 9 of the depicted device and the toxicant layer 10 and mesh covering 11 on lid insert 8. The lid can be designed to remain open by a friction fitting (not shown) with respect to reservoir 9 or by any other mechanism to tab or pin it open until time for discard.

The toxicant-retaining portion of the target area can be constructed from a variety of materials including paper and polymers such as polyolefins. The preferred materials are water-proof paper or other biodegradable materials except where some water permeability is desired. The container is preferably of a shape which would allow the device as a whole to be free-standing on level surfaces, or mounted. Its configuration is preferably box-shaped or rectangular. The target area can be embossed with contrasting vertical lines and/or representations of standing flies since these are believed to aid in attracting flies to the device.

A number of methods can be used to impregnate the porous surface of the target area with insecticide. For example, the target area material can be prepared by soaking in a solution of TNMT and dried, the surface of the target area can be painted with a solution of TNMT, or TNMT can be sprinkled on the target area. The insecticide is typically applied so as to be present on the target area in the amount of at least about 2.0 milligrams per square centimeter or more. At a minimum, the insecticide concentration on a target area will be sufficient to constitute a lethal dose when ingested by the fly.

A preferred means of attracting the flies is the use of a sex attractant (pheromone). Muscalure (cis-9-tricosene) is the sex attractant of choice for houseflies; the sex attractant can be contained in the target area or incorporated into the safety mesh. In its most preferred mode, the device incorporates all of the above means of attracting the flies. Foodstuffs of choice include sugar or corn syrup. The foodstuff can be deposited on the target area as a glaze or sprinkled on the target area. Although it works dry as well, the most preferred trap embodiment will contain sugar on a moist target area, and a pheromone sex lure as well. It is also contemplated that any one particular device can be designed with a removable fly-holding tray if desired.

The following Example illustrates the invention.

EXAMPLE

Assembly of the box model flytrap begins with formulation of the glaze toxicant (below). Paint the formulation on a 4 inch square of black construction paper until the surface is uniformly damp. After the glaze has dried, 12 to 24 hours, a piece of 4 inch square clear plastic netting is glued to the treated paper. The flat sheet of low density Polyethylene netting is available from NWS Corporation, 530 Gregory Avenue NE, Roanoke, Va. 24016. Once the paper/netting square is set, it can be glued to the inside half of the clam shell box available from Keyes Fibre Company, 3003 Summer Street, P. 0. Box 3861, Stamford, Conn. 06905. A piece of monofilament line is glued to the top and bottom halves so that when the clam shell box is opened, the bottom half should be supported by the monofilament line and be at a 90 degree angle from the top half. Cut two pieces of foam adhesive tape about 3½ inches long. Place the foam on the backside top half of the clam shell box. Place 29 microliters of muscalure on the center of the paper/netting square.

Toxicant Formulation:

| polyvinylpyrrolidone (PVP) | 0.66 g |
| corn syrup | 23.90 g |
| 50% ethanol/water, V/V | 17.40 g |
| technical grade toxicant (TNMT) | 5.00 g |

During toxicant formulation, the combined corn syrup and ethanol solutions are stirred while the PVP, then toxicant, are added. Stirring is continued until the solids are dissolved.

This device is particularly useful in killing flies in home and business environments including restaurants, stores, and the like. It is characterized by good accessibility by insects and suitability for placement where devices comprising bulky housing and containment structures could not be located.

Toxicant

Certain physical and chemical properties of nitromethylene heterocycles are known. For example, insecticidal activity of TNMT against the house fly (*Musca domestica*) was determined by directly spraying the insects in a wind tunnel. The compound has the formula:

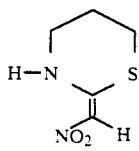

and a toxicity quotient of 161 vs. 100 for ethyl parathion. The physical properties of TNMT are as follows:

| Melting point, °C. | 78 |
| Solubility, % weight/volume | Water, 20 |
| | Acetone, 7 |
| Hydrolytic Stability | 3 hours at pH 1.1 |
| (half life) | over 3 months at pH 7.0 |
| Photochemical Stability | Water, 10 minutes |
| (half life, 350 nm simulated sunlight, 100 ppm) | $CH_2Cl_2$, 1 minute |

The N-formyl derivative of TNMT has the following structure:

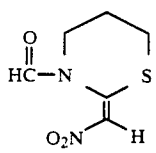

Pheromones and Other Attractants

Pheromones or attractants may be classified as sex, food, or oviposition lures. Additional classifications or subclassifications include trail pheromones, aggregating and other pheromones. Broadly defined, a sex pheromone is an odor released by one member of the species which attracts the opposite member for the purpose of mating. The presence of sex pheromones has been demonstrated in most orders of insects and they can be produced by the male or female of the species. In many cases, it is the female which produces the attractant. A large number of pheromones that are useful in the devices of this invention have been identified and created synthetically including those listed in Table 1.

TABLE 1

| Compounds | Insect |
| --- | --- |
| cis-7-dodecenyl acetate | cabbage looper *Trichoplusia ni* |
| cis-8-dodecenyl acetate | oriental fruit moth *Grapholitha molesta* |
| cis-7,8-epoxy-2-methyloctadecane | gypsy moth *Lymantria dispar* |
| undecanal undecan-1-al | greater wax moth *Galleria mellonella* |
| cis-2-isopropenyl-1-methylcyclobutaneethanol | boll weevil *Anthonomus grandis* |
| 2-methylheptadecane | tiger moths *Holomelina aurantiaca* complex |
| trimedlure | mediterranean fruit fly *Ceratitis capitata* |
| cuelure | melon fly *Dacus cucurbitae* |
| cis-9-tricosene | housefly *Musca domestica* |

We claim:

1. A device for killing insects consisting essentially of these two components that are movable in relation to one another:
   (i) a toxin-containing target with an optional mesh covering and an optional attractant for the insects; and
   (ii) a reservoir closable with the target so that the target is not exposed and openable so that the target is exposed; when the device is open, the target is positioned above the reservoir which serves to hold insects which fall into it after being killed by contact with the exposed target; the target containing tetrahydro-2-(nitromethylene)-2H-1,3-thiazine as the toxin.

2. A device according to claim 1 wherein the toxin is the N-formyl derivative of tetrahydro-2-(nitromethylene)-2H-1,3-thiazine.

3. A device according to claim 1 employing a sex attractant.

4. A device according to claim 3 wherein the attractant is muscalure.

5. A device according to claim 1 employing, as an attractant, a feeding stimulant which is sweet.

6. A device according to claim 5 wherein the feeding stimulant is sugar or corn syrup.

7. A device according to claim 1 employing a plastic safety mesh.

8. A device according to claim 1 in the shape of a clam shell box.

9. A device according to claim 1 wherein the target insects are flies.

10. A device according to any one of claims 1, 3 or 4 wherein components (i) and (ii) are hinged together for opening and closing.

11. A device according to any one of claims 1, 3 or 4 wherein components (i) and (ii) have a friction fit between them.

12. A method for killing insects comprising exposing them to a device according to claim 1.

* * * * *